No. 849,062. PATENTED APR. 2, 1907.
C. A. GAULD.
VEHICLE WHEEL.
APPLICATION FILED MAR. 27, 1906.
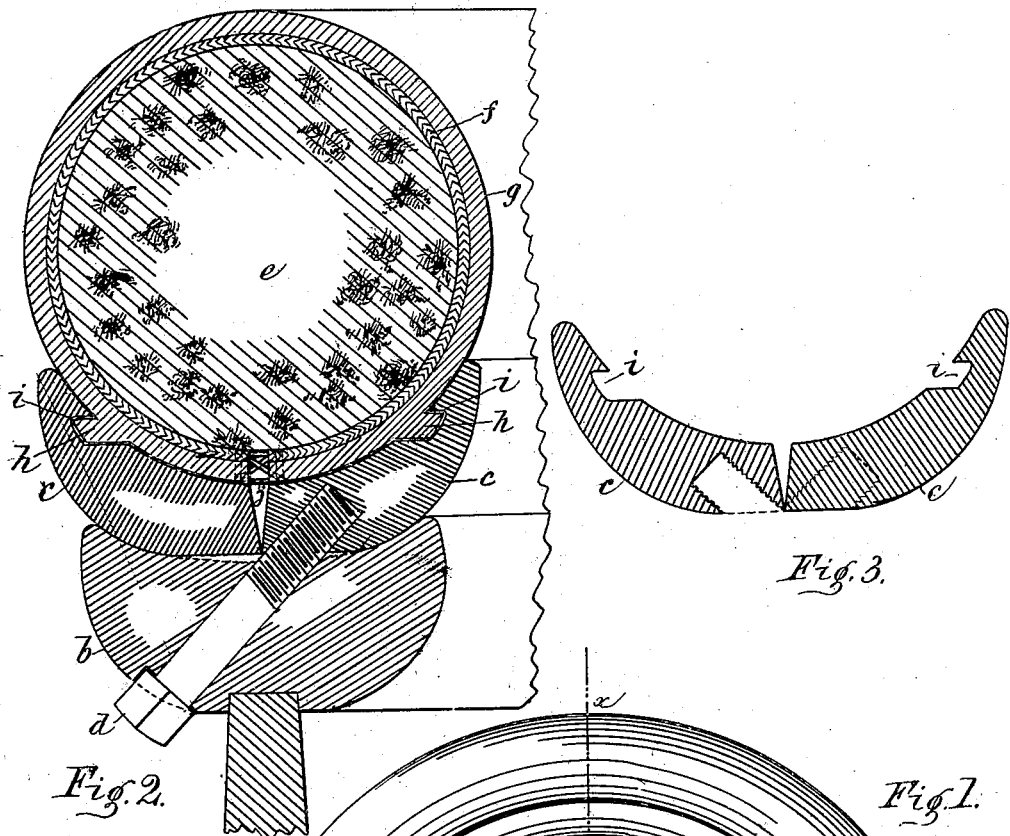
Fig.2. Fig.3. Fig.4. Fig.1.
Witnesses.
F. M. Laird.
S. V. Timson
Inventor.
Chester A. Gauld,
Per W. Bruce
Atty.

UNITED STATES PATENT OFFICE.

CHESTER ARTHUR GAULD, OF HAMILTON, ONTARIO, CANADA.

VEHICLE-WHEEL.

No. 849,062.  Specification of Letters Patent.  Patented April 2, 1907.

Application filed March 27, 1906. Serial No. 308,248.

*To all whom it may concern:*

Be it known that I, CHESTER ARTHUR GAULD, a citizen of the Dominion of Canada, residing at 42 Gore street, in the city of Hamilton, in the county of Wentworth, in the Province of Ontario, Canada, have invented certain new and useful Improvements in Vehicle-Wheels; and I do hereby declare that the following is a full, clear, and exact description of the construction and operation of the same.

My invention relates to improvements in vehicle-wheels which can be adapted to various kinds of vehicles, but more particularly to automobiles; and the objects of my improvement are, first, to provide a non-puncturable tire; second, a light and durable tire; third, a tire that will run as smoothly and easy as a pneumatic one; fourth, a tire that will possess the resiliency of a pneumatic tire with the strength of a solid tire. I attain these objects by the mechanism illustrated in the accompanying drawings, in which—

Figure 1 is a side elevation of my vehicle-wheel. Fig. 2 is a transverse section of the same on the line $x$ $x$. Fig. 3 is a cross-section of metal rim. Fig. 4 is an elevation of one of the screws employed in securing the wood felly to the metal rim.

Similar letters refer to similar parts throughout the several views.

A, Fig. 1, represents a side elevation of the entire wheel, consisting of a wood felly $b$, size two and five-eighths inches by one inch and a quarter and containing twelve spokes, (more or less.)

$c$ is a metallic rim formed in two sections, as shown at Figs. 2 and 3, about half an inch thick and circular-shaped in form, being convex on the outside and concave on the inside. Also each of the said sections are provided with an annular groove $i$, practically of the form shown at Figs. 2 and 3. The said sections are secured to the wood felly by a series of set-screws $d$, passing in an alternate oblique direction through the wood felly $b$ into the metallic rim $c$, as shown at Figs. 2 and 3. The said set-screws are about two and a quarter inches long.

The center of the tire consists of solid cork $e$, covered with a heavy duck canvas $f$ or like material, and the outside casing is of rubber $g$, which will be molded with two annular projections $h$ $h$, which will be made to fit into the annular grooves $i$ of the metallic rim $c$.

The inner sides of the said metallic rim $c$ are slightly beveled outward in the center, as shown at Figs. 2 and 3, for the purpose of tightening the tire in place.

Both the canvas portion $f$ and the outer rubber covering $g$ are laced together in the center of the inner side by lacing-strings $j$, as shown at Fig. 2.

Fig. 1 shows three bolt-heads $d$. A similar number are on the opposite side of the wheel, and the heads of said bolts are countersunk, as shown by dotted lines at Fig. 2, and it will further be observed that the wood felly $b$ is slightly hollowed on the side next the metallic rim to allow the circumference of the rim to be contracted.

Having thus described my device and its advantages, what I claim as my invention, and desire to secure by Letters Patent, is—

In a vehicle-wheel a wood felly of a wheel formed convex on the rear or spoke side and concave on the front or opposite side, a correspondingly-shaped metallic rim, formed in two longitudinal halves, their inner sides beveled slightly outward, and made to fit in and be secured to the said concavo-convex felly, two annular grooves formed on the inside of said metallic rim, a solid outer tire of a light and fungous material, as cork, formed annularly, and inclosed in a light but strong material, as duck canvas, open along the center of the inside, and laced tight by strings, and covered on the outside with a cover of elastic material, as rubber, also open along the center of the inside and laced to tighten it around the tire portion, the said rubber covering constructed with annular projections on the sides which fit into the annular grooves in the metallic rim, and hold the tire to the said rim, all constructed for the purpose specified.

Dated at Hamilton, Ontario, the 20th day of March, 1906.

CHESTER ARTHUR GAULD.

In presence of—
F. M. LAIRD,
WM. BRUCE.